United States Patent [19]

Murakami

[11] 4,388,419
[45] Jun. 14, 1983

[54] UNSATURATED POLYESTER RESIN FOAMS AND METHOD OF PREPARATION

[75] Inventor: Shinji Murakami, Kyoto, Japan

[73] Assignee: Eiwa Chemical Industry Co., Ltd., Kyoto, Japan

[21] Appl. No.: 339,009

[22] Filed: Jan. 12, 1982

[30] Foreign Application Priority Data

Jan. 19, 1981 [JP] Japan ................................. 56-5113

[51] Int. Cl.³ ............................................. C08J 9/10
[52] U.S. Cl. .................................... 521/103; 521/96; 521/106; 521/121; 521/123; 521/128; 521/136; 521/182
[58] Field of Search ................. 521/103, 96, 106, 121, 521/123, 128, 136, 182

[56] References Cited

U.S. PATENT DOCUMENTS

| | | |
|---|---|---|
| 3,260,688 | 7/1966 | Watanabe et al. .................. 521/138 |
| 3,920,589 | 11/1975 | Jacobs et al. ......................... 521/182 |
| 3,920,590 | 11/1975 | Jacobs et al. ......................... 521/182 |
| 3,920,591 | 11/1975 | Jacobs et al. ......................... 521/182 |
| 4,322,502 | 3/1982 | Stott et al. ............................ 521/99 |
| 4,327,196 | 4/1982 | West et al. ........................... 521/182 |

Primary Examiner—Morton Foelak
Attorney, Agent, or Firm—Armstrong, Nikaido, Marmelstein & Kubovcik

[57] ABSTRACT

Unsaturated polyester foams having fine and uniform cells are prepared at an atmospheric temperature from an admixture which comprises in combination a liquid unsaturated polyester resin, a hydrazide compound, a cobalt compound and a powdered inorganic compound selected from the group consisting of percarbonates, perborates and perphosphates.

10 Claims, 2 Drawing Figures

UNSATURATED POLYESTER RESIN FOAMS AND METHOD OF PREPARATION

BACKGROUND OF THE INVENTION (1) Field of the Invention

This invention relates to a foamable unsaturated polyester resin composition, an unsaturated polyester resin foam and a method of preparing such a foam.

(2) Description of the Prior Art

Unsaturated polyester resin is inexpensive and exhibits high strength characteristics and excellent resistance to heat. Therefore, this resin is commonly used for the materials for furniture, bath-tubs, marine structures, structural members or the like. In case unsaturated polyester resin having said excellent properties is able to be expanded, the foam provides a significant economic advantage in the value of the material saved by the weight reduction. In addition, the availability of acceptable low density polyester foams permits wide applications for polyester resins, by virtue of their good properties, i.e. lightness, thermal insulating properties and good sense of touch.

Heretofore, polyester foams have been prepared by the use of chemical blowing agent. However, the methods employed and the foams produced have not been wholly satisfactory or commercially successful. This is because the curing behavior of unsaturated polyester resin is different from that of other resins and makes it very difficult to produce low-density foams. Unsaturated polyester resin composition is normally liquid and exhibits fluidity, but with the proceeding of polymerization reaction the viscosity of said composition increases rapidly resulting in the gelation and thereafter the cure in no time. Therefore, the viscosity suitable for the foaming disappears in very short period of time, and even if the blowing agent is employed, it is very difficult to adjust the rate of decomposition of the blowing agent to the change in viscosity. In addition, the exothermic heat is small before gelation, but increases rapidly after gelation. Therefore, a volatile blowing agent can not be employed.

Notwithstanding said difficulties, the light-weight foamed product of unsaturated polyester resin has long been desired. Hence somewhat different approaches to overcoming said problems are proposed. One of them is disclosed in Japanese Patent Publication No. 39107/1975, which comprises adding expandable micro-capsules into unsaturated polyester resin composition and thereafter heating the mixture to expand the micro-capsuls and to cure the unsaturated polyester resin simultaneously thereby giving rise to a light-weight product. However, this method can not be applied to a cold molding, such as hand lay-up, spray-up and cold pressing commonly employed in the plastics industry.

There has been known a method for preparing a water-containing polyester, in which the polyester resin dispersed with fine particles of water is cured to obtain a foamed product. The product prepared by this method has a drawback that a water content is gradually lost from the surface of polyester resin with the passing of time, which results in the change in size and the warpage or distortion in the molded article.

One of the methods for producing unsaturated polyester resin foams by the use of blowing agent is disclosed in Japanese patent publication No. 29772/1973. The unsaturated polyester resin used in this method is not a usual solution of polyester dissolved in styrene monomer, but a solid or powder of prepolymer with diallyl phthalate. In this method, since the starting materials are solid, the molding must be carried out at an elevated temperature higher than the melting temperature of materials, e.g. above 100° C. as described in said patent specification. Therefore, this method can not be applied to the cold molding.

Recently, there has been proposed in U.S. Pat. No. 3,920,590 a liquid polyester resin foamable composition from which such a foam is prepared. This composition comprises in combination a liquid unsaturated polyester resin, hydrogen peroxide or an organic peroxide as a curing agent, a cobalt compound as a promotor and a hydrazide compound as a blowing agent, both the peroxide-cuing agent and cobalt promotor being present in high concentration levels. In this system, the reactivity of organic peroxide with the hydrazide compound and cobalt compound is comparatively low, and thus the amount of gas evolved is rather little resulting in the lower expansion. Therefore, in said system the organic peroxide should be present in high concentration levels. However, in case the organic peroxide is used at high concentration, unsaturated polyester resin is cured very rapidly, and thus the expansion of polyester resin caused by the decomposition of blowing agent is suppressed due to said rapid curing, which results in the surface cracking or the lower expansion. Therefore, said patent literature teaches that the preferred curing agent is hydrogen peroxide.

Nevertheless, by the use of hydrogen peroxide as the curing agent in unsaturated polyester resin foamable composition, the following problems will arise. A commercially available hydrogen peroxide is an aqueous solution. Hence, in case an aqueous solution of hydrogen peroxide is added to the non-aqueous system or phase, particularly to the resin, the dispersion of hydrogen peroxide in the resin is not uniform and, as the result, the foamed product with uniform cellularity will not be obtained. In addition, hydrogen peroxide has the explosive reactivity and rapidly react with said other ingredients only by mixing them. Therefore, the preliminary mixing of hydrogen peroxide with other ingredients is not permitted, and the foamable composition is constituted by the multi-component system or multi-liquid system when used, which result in the difficulties of the operation and the controlling of reaction. Moreover, the presence of water in unsaturated polyester resin composition affects the curing of resin and will lead to the insufficient curing and the surface cracking. As being well known, hydrogen peroxide has per se the defect of poor stability. Furthermore, by the use of hydrogen peroxide, the foamed product is coloured to yellow.

As mentioned above, although unsaturated polyester foams have been produced, the techniques employed in preparing these foams having fine and uniform cellular structure are not commercially successful or practical.

SUMMARY OF THE INVENTION

An object of this invention, therefore, is to provide a method for easily producing unsaturated polyester resin foams with very low density at lower cost.

Another object of this invention is to provide unsaturated polyester resin foamable compositions from which low-density unsaturated polyester resin foams having fine and uniform cellular structure are prepared.

Still another object of this invention is to provide foamed articles of unsaturated polyester resin which are highly expanded and have the uniform and fine cell structure.

To accomplish the objects described above and other objects, according to the present invention, there is provided an unsaturated polyester resin foamable composition which compsises in combination a liquid unsaturated polyester resin, a hydrazide compound, a cobalt compound and at least one powdered inorganic compound selected from the group consisting of percarbonates, perborates and perphosphates. Unsaturated polyester resin foams are produced from the above foamable composition in a short period of time after preparation of the foamable composition. In the foamable composition each of the foregoing components must be present in combination.

DETAILED DESCRIPTION OF THE INVENTION

Figure 1:
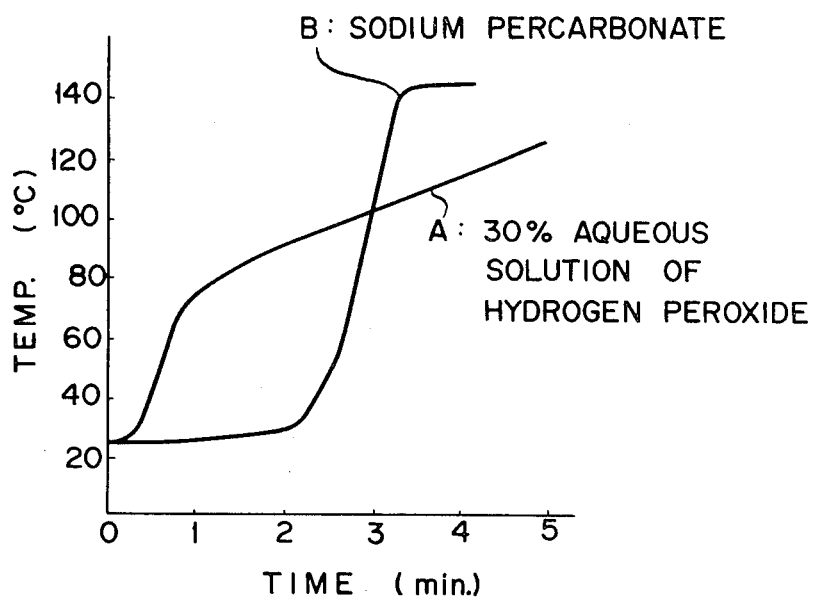
FIG. 1 is a graph showing exotherm curves of unsaturated polyester resin foamable compositions.

The present invention is based on the fact that the expansion and curing of unsaturated polyester resin foamable composition take place at room temperature in the presence of a hydrazide compound, a cobalt compound and a particular powdered inorganic compound.

A hydrazide compound usually decomposes at a temperature above 100° C. in air or inert gas. Therefore, even when this compound is used as a blowing agent, the heating up to above 100° C. is needed for the decomposition of this compound and the attendant liberation of gas.

On the other hand, the powdered inorganic compounds used in the present invention, i.e. percarbonates, perborates and perphosphates are commonly employed as a bleaching agent and gradually decompose at a temperature above 100° C. in air or inert gas. Thus, it will be unbelievable that these compounds could decompose at room temperature in the inert gas, and there has not been tried to use these compounds as the cross-linking agent for cold curing.

Surprisingly, it has now been found that the coexistence of three components; a hydrazide compound which decomposes at a temperature above 100° C., at least one powdered inorganic compound selected from the group consisting of percarbonates, perborates and perphosphates which are per se stable and decompose at above 100° C. and a cobalt compound, results in the liberation of gas at room temperature by the interaction among these three components. It should be noted that there is no need to employ a peroxide-curing agent, such as methyl ethyl ketone peroxide and benzoyl peroxide commonly used, and that low-density unsaturated polyester foams can be produced at room temperature.

When the liquid unsaturated polyester is mixed with the foregoing three components, the reaction among three components takes place, the gas generates sharply in large amounts and the gelation and curing of foamable composition take place immediately without heating. In addition, the viscosity of the composition changes to the suitable viscosity for foaming the composition in this course of the reaction, and the expanding gas is timely liberated at this course. The expansion and curing of the composition are effected in the ideal state.

The foregoing reaction takes place only in the presence of the above-mentioned three components. In the presence of two components, e.g. hydrazide compound-powdered inorganic compound, hydrazide compound-cobalt compound and powdered inorganic compound-cobalt compound, no reaction takes place and, needless to say, the liberation of gas and the expansion do not occur.

As mentioned above, in accordance with the present invention, low-density unsaturated polyester resin foams are produced in a simple procedure. The foams obtained are characterized by being free from splits, surface cracks and the other defect and having fine uniform cellular structure.

The liquid unsaturated polyester resins used in this invention comprises a linear or only slightly branched polyester resin synthesized in the usual manner and a liquid crosslinkable monomer. The linear or slightly branched polyester is typically prepared as a condensation or reaction product of an unsaturated polybasic and a polyhydric compound, e.g., the condensation product of an unsaturated dibasic acid of alpha-beta ethylenically unsaturated compound and a di- or trihydric compound, such as glycols. Often a saturated polybasic acid or anhydride, such as a dibasic acid, is employed with the unsaturated acid or anhydride to modify the reactivity of the unsaturated resin. The linear or slightly branched polyester is dissolved in a liquid cross-linkable monomer, such as styrene, vinyl toluene, acrylates and methacrylates. Such liquid resin compositions may include a wide variety of other additives, such as polymerization inhibitors, flexibilizers, flame retardants, air-desiccants and other modifiers giving them a thixotropy or resistance to light.

The powdered inorganic compound used in the present invention is selected from the group consisting of percarbonates, perborates and perphosphates, which are respectively the adducts of hydrogen peroxide with each of carbonates, metaborates and pyrophosphates. Examples of the above compounds include, but are not limited to: sodium percarbonate, sodium perborates, magnesium perborate, calcium perborate, ammonium perborate and sodium perphosphate. The preferred compounds are sodium percarbonate and sodium perborate. These compounds are employed in amounts ranging from 0.1 to 20 parts by weight per hundred parts by weight of resin (phr), preferably from 0.2 to 10 phr. The use of the compound in the range below 0.1 phr is disadvantageous in view of the reactivity and the foamability. On the other hand, if the compounds are employed in the range above 20 phr, the amount of gas evolved is too much, which results in the out of keeping with the viscosity of resin. The foams obtained is thus apt to the surface cracking or splits. The use of large amount of the compound is also disadvantageous in view of the cost.

The advantages of the use of above inorganic compounds lie in the following points. The percarbonates, perborates and perphosphates are per se stable and are in the state of powder. Therefore, the handling of them is very easy, and it is possible and easy to uniformly disperse them in the liquid unsaturated polyester resin, which is a contrast to hydrogen peroxide. In addition, these compounds do not react with the hydrazide compound only or with the cobalt compound only, and, as mentioned hereinbefore, the reaction takes place only in the presence of these three components. Thus, the operation and the controlling of reaction are very easy, and it is possible to preliminarily mix another component with percarbonate, etc., which provides the foamed product with uniform cellularity. Furthermore, the carbonate moiety of percarbonate, the metaborate moiety of perborate and the pyrophosphate moiety of perphosphate seem to act as a catalyst of hydrogen peroxide resulting in the sharp generation of expanding gas and the increase of the degree of expansion. This is also a great contrast to hydrogen peroxide.

Examples of hydrazide compounds include, but are not limited to: maleic hydrazide, oxalyl hydrazide, benzene sulfonyl hydrazide, toluene sulfonyl hydrazide, toluene-1.3-disulfonyl hydrazide, p,p'-oxybis (benzene sulfonyl hydrazide) and similar hydrazide, hydrazine salts or derivatives. The hydrazide compounds are employed in amounts ranging from 0.1 to 20 phr, preferably from 0.2 to 10 phr for the same reason as described on the powdered inorganic compounds. The amount of hydrazide compound may be selected form the foregoing range depending upon the desired degree of expansion.

The cobalt compounds used in the present invention are the promoters commonly used for the preparation of normal unsaturated polyester resin. Examples of such cobalt compounds include, but are not limited to: cobalt naphthenate, cobalt octoate, cobalt oleate, cobalt linoleate, cobalt stearate, cobalt-2-ethylhexoate and cobalt acetylacetonate. The cobalt compounds are employed in amounts ranging from 0.003 to 0.6 phr, preferably from 0.006 to 0.3 phr as a metal content.

The unsaturated polyester resin foamable compositions of this invention may include other additives such as cross-linking agents commonly used (peroxides), fillers, fibrous reinforcing materials, colorants, parting agents, foam stabilizers or the like, if desired.

The foregoing three components; powdered inorganic compound, hydrazide compound and cobalt compound may be added to the liquid unsaturated polyester resin simultaneously, or only one component may be preliminarily mixed into the liquid unsaturated polyester resin and thereafter the mixture of other two components may be mixed thereinto, or vice versa.

According to the present invention, the low-density unsaturated polyester resin foams having fine and uniform cellular structure and good properties such as high thermal insulating properties, sufficient mechanical strength and good sense of touch are produced only by mixing the lquid unsaturated polyester resin with the foregoing three components. The production of low-density unsaturated polyester resin foams according to the present invention does not require any special processing. And the unsaturated polyester resin foamable compositions and the method of producing their foams according to the present invention can be applied to a cold molding, such as hand lay-up, spray-up and cold pressing commonly used for the production of polyester resin, which provide the significant technical advantages and wide applications for polyester resins. In addition, the foamable compositions and the method of this invention do not employ the organic peroxides commonly used, but inexpensive compounds, i.e. powdered inorganic compounds, which are highly advantageous in view of the safety and the cost.

Nowadays, unsaturated polyester resin is employed in place of the steel stock. Under such circumstances, it is required to shape the resin in a short period of time as in the steel stock. In the process of this invention the reaction and expansion of the composition take place immediately after the mixing of all components and are completed in very short period of time. Therefore, the method of this invention is very useful in the fields which require a short-time reaction, such as spray-up molding and RIM process.

For more specific illustration of the present invention, the following examples are presented which are intended to be merely illustrative of and not in any sense limitative of the invention.

EXAMPLE 1

A laminate resin composition of unsaturated polyester (styrene content: 30%) was mixed with 2 phr of p, p'-oxybix (benzene sulfonyl hydrazide), 0.5 phr of cobalt (12%) octoate and 2 phr of sodium percarbonate. The mixture was immediately poured into a mold having the cavity of 150×150×7 mm. The expanding gas was immediately generated, and the mixture geled within two minutes and thereafter cured. The foamed product of unsaturated polyester resin having fine and uniform cells was thus obtained. The above procedure was carried out at room temperature. After the gelation, the temperature of the mixture rose rapidly. The degree of expansion of the foamed product was 3.8 times the original volume.

COMPARATIVE EXAMPLE

The procedure of Example 1 was repeated employing 2 phr of 60% aqueous hydrogen peroxide solution in place of sodium percarbonate. In this case, the gel time was five minutes, the cure was insufficient, and the product obtained had a coarse cellular structure. In addition, the degree of expansion of the foamed product was only 1.8 times the original volume, which was due to the time-lag of the generation of expanding gas and the gelation.

EXAMPLE 2

The same resin as used in Example 1 was mixed with 30 phr of chipped glass. To this resin composition, 5 phr of toluene sulfonyl hydrazide, 3 phr of sodium perborate and 1 phr of cobalt (6%) naphthenate was added and mixed in a short period of time. The mixture was poured into the mold. After the pour the mixture geled within 55 seconds, and the expansion was completed about three minutes later. The expansion degree of the foamed product obtained was 4.0 times the original volume.

EXAMPLE 3

A casting polyester resin (styrene content: 40%) was mixed with 5 phr of sodium percarbonate, 5 phr of maleic hydrazide and 1 phr of cobalt (6%) naphthenate. 0.5 phr of t-butyl-perbenzoate was further added to the above mixture, and thereafter the mixture was poured into the mold. The gas was generated immediately after the pour, and the increase of viscosity and the expansion occurred about 1 minute and 45 seconds later. The gel time was about 2 minutes and 30 seconds. The foamed product obtained had fine and uniform cells, and the degree of expansion thereof was 4.8 times the original volume.

EXAMPLE 4

The same resin as used in Example 1 was mixed with 30 phr of calcium carbonate and 20 phr of chipped glass as the fillers. This mixture was further mixed with 0.5 phr of p, p'-oxybis (benzene sulfonyl hydrazide), 0.3 phr of sodium perborate and 0.25 phr of cobalt (12%) octoate and poured into the mold. The gas was generated immediately, the mixture geled within three minutes, and thereafter the cure was proceeded with the exotherm. The foamed product obtained had the expansion degree of 1.8 times the original volume and the strength sufficient for a good structural material.

EXAMPLE 5

The same resin as used in Example 1 was mixed with 0.5 phr of cobalt (6%) naphthenate, 2 phr of p, p'-oxybis (benzene sulfonyl hydrazide) and varying amounts of sodium percarbonate. The results are shown in Table I. For the sake of contrast, the examples using hydrogen peroxide are also shown.

EXAMPLE 6

The procedure of Example 5 was repeated using either 2 phr of sodium percarbonate or 2 phr of 30% aqueous solution of hydrogen peroxide. The exotherm curves of the compositions after the mixing are shown in FIG. 1.

As can be seen from FIG. 1, in case of hydrogen peroxide (curve A) the initial reaction is rapid resulting in the rapid increase of exotherm, i.e. the starting of cure, but about one minute later the exotherm increases gradually resulting in the insufficient cure. In addition, the gel time is about 30 seconds, that is to say, the period maintaining the viscosity suitable for the expansion is very short. It should be noted that the viscosity of the composition increases during said 30 seconds.

On the other hand, in case of sodium percarbonate (curve B) the initial increase of exotherm is very little, but about two minute later the increase of exotherm is very rapid, which is a great contrast to hydrogen peroxide. Therefore, the period maintaining the viscosity suitable for the expansion is longer than that of hydrogen peroxide.

EXAMPLE 7

1 g of p, p'-oxybis (benzene sulfonyl hydrazide), 0.5 g of cobalt (6%) naphthenate and either 2 g of sodium percarbonate or 2 g of 30% aqueous solution of hydrogen peroxide were added to each test tube containing 10 ml of liquid paraffin, and each test tube was shaked and connected to the gas burettes. The amount of gas evolved from each tube was determined at room temperature after a predetermined period, and the relation between the amounts of gas evolved and the time is shown in FIG. 2.

Figure 2:
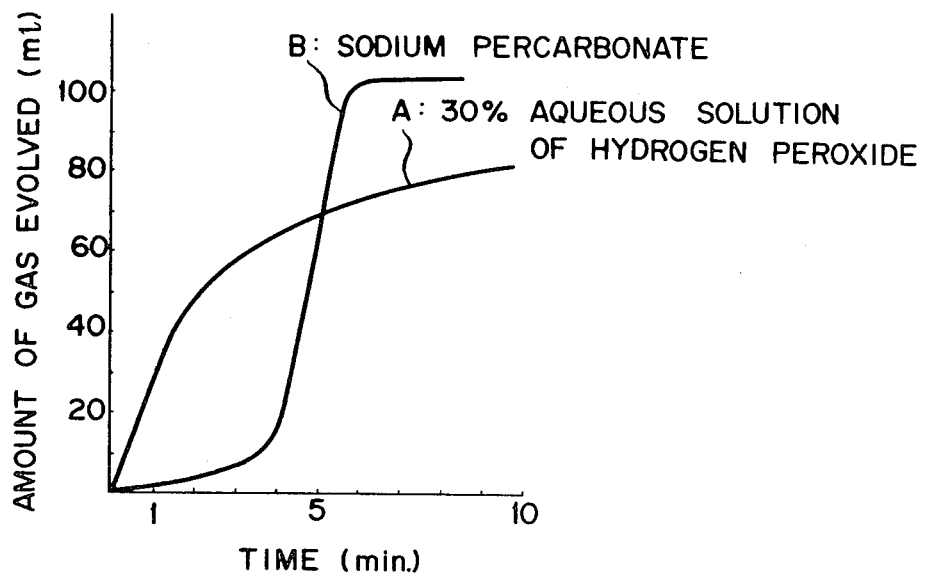
FIG. 2 is a graph showing the changes of amounts of gas evolved from the mixture of blowing agent, cobalt promotor and curing agent along the course of time.

As can be seen from FIG. 2, in case of hydrogen peroxide (curve A) the rate of evolution of gas in the initial stage is very rapid, but after a few minutes the rate of evolution is slowed down and the evolution of small amounts of gas is continued, which results in the loss of expansion and the splits or surface crack. On the other hand, in case of sodium percarbonate (curve B) the amount of gas evolved in the initial stage is little, but about four minutes later the gas is rapidly generated in very short period of time. Thus, a foamed product being free from the splits may be effectively produced. Hereupon, it should be noted that the above test was carried out at room temperature, and the polymerization reaction did not take place because of the absence of resin. In the actual expansion process, the polymerization and curing reaction produces heat, and thus the gas is generated in more short period of time.

TABLE 1

| Number | Sodium percarbonate (phr) | Hydrogen peroxide (30% in water) (phr) | Gel time | Degree of expansion | Coloured or not | Others |
|---|---|---|---|---|---|---|
| 1 | 0.05 | — | 3' | 1.6 | Not | Insufficient cure |
| 2 | 0.1 | — | 2' | 2.0 | Not | — |
| 3 | 0.2 | — | 1'50" | 2.1 | Not | — |
| 4 | 1.0 | — | 1'30" | 2.7 | Not | — |
| 5 | 5.0 | — | 1'20" | 3.5 | Not | — |
| 6 | 10 | — | 1'20" | 4.0 | Not | — |
| 7 | 20 | — | 1'15" | —*1 | Not | — |
| 8 | — | 2 | 1' | —*2 | Yellow | Insufficient cure |
| 9 | — | 5 | 55" | —*3 | Yellow | Insufficient cure |

*1, *2, *3: The splits occurred. Therefore, the degree of expansion could not be determined.

What we claim is:

1. An foamable liquid unsaturated polyester resin composition which comprises in combination:
   (a) a liquid unsaturated polyester resin in solution with an ethylenically unsaturated monomer,
   (b) a hydrazide compound in an amount of from 0.1 to 20 phr,
   (c) a cobalt compound in an amount of from 0.003 to 0.5 phr as a metal content, and
   (d) at least one powdered inorganic compound selected from the group consisting of percarbonates, perborates and perphosphates in an amount of from 0.1 to 20 phr.

2. The composition according to claim 1, wherein the inorganic compound is sodium percarbonate.

3. The composition according to claim 1, wherein the inorganic compound is sodium perborate.

4. The composition according to claim 1, wherein the hydrazide compound is selected from the group of maleic hydrazide, oxalyl hydrazide, benzene sulfonyl hydrazide, toluene sulfonyl hydrazide, toluene-1,3-disulfonyl hydrazide and p,p'-oxybis (benzene sulfonyl hydrazide).

5. The composition according to claim 1, wherein the cobalt compound is selected from the group of cobalt naphthenate, cobalt octoate, cobalt oleate, cobalt linoleate, cobalt stearate, cobalt-2-ethylhexoate and cobalt acetylacetonate.

6. A method for the production of unsaturated polyester resin foams having fine and uniform cells, which comprises:
   mixing a liquid unsaturated polyester resin with a hydrazide compound, a cobalt compound and at least one powdered inorganic compound selected from the group consisting of percarbonates, perborates and perphosphates thereby expanding and curing the unsaturated polyester resin composition.

7. The method according to claim 6 which includes injecting the foamable unsaturated polyester resin composition into a mold prior to expanding and curing to provide a molded foamed product.

8. The method according to claim 6, wherein one compound selected from the group of the hydrazide compound, cobalt compound and inorganic compound is preliminarily mixed to the liquid unsaturated polyester resin and thereafter the remaining compounds or mixture thereof are mixed to the mixed polyester resin.

9. The method as claimed in claim 6, wherein the inorganic compound is sodium percarbonate.

10. The method as claimed in claim 6, wherein the inorganic compound is sodium perborate.

* * * * *